United States Patent
Chang et al.

(10) Patent No.: US 7,726,035 B2
(45) Date of Patent: Jun. 1, 2010

(54) MEASURING DEVICE

(75) Inventors: Chih-Kuang Chang, Taipei Hsien (TW); Sen Zhang, Shenzhen (CN); Jin-Kui Zeng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 20 days.

(21) Appl. No.: 12/036,274

(22) Filed: Feb. 24, 2008

(65) Prior Publication Data

US 2009/0151182 A1 Jun. 18, 2009

(30) Foreign Application Priority Data

Dec. 12, 2007 (CN) .................... 2007 1 0203020

(51) Int. Cl.
*G01B 5/20* (2006.01)

(52) U.S. Cl. .................. 33/551; 33/199 R; 33/533; 33/546

(58) Field of Classification Search ............ 33/1 M, 33/199 R, 199 B, 501.02, 501.05, 501.06, 33/503, 533, 549, 551, 552, 553, 554, 555, 33/545, 546

See application file for complete search history.

(56) References Cited

U.S. PATENT DOCUMENTS

| | | | | | |
|---|---|---|---|---|---|
| 4,551,919 | A | * | 11/1985 | Sakata et al. | 33/1 M |
| 4,851,760 | A | * | 7/1989 | Luebke | 33/533 |
| 5,515,615 | A | * | 5/1996 | Twigg et al. | 33/551 |
| 5,646,724 | A | * | 7/1997 | Hershline | 33/199 R |
| 6,442,857 | B1 | * | 9/2002 | Atsuhiko et al. | 33/553 |
| 6,587,810 | B1 | * | 7/2003 | Guth et al. | 33/503 |
| 6,854,193 | B2 | * | 2/2005 | Lotze | 33/503 |
| 6,873,420 | B2 | * | 3/2005 | Davis et al. | 356/601 |
| 7,222,434 | B2 | * | 5/2007 | Kikuchi | 33/503 |
| 2004/0205974 | A1 | * | 10/2004 | Ogura | 33/503 |
| 2004/0231177 | A1 | * | 11/2004 | Mies | 33/503 |
| 2004/0250434 | A1 | * | 12/2004 | Ogura et al. | 33/503 |
| 2005/0172505 | A1 | * | 8/2005 | Trull et al. | 33/503 |
| 2007/0271803 | A1 | * | 11/2007 | Ishikawa | 33/503 |
| 2008/0307662 | A1 | * | 12/2008 | Fuchs et al. | 33/503 |
| 2009/0013549 | A1 | * | 1/2009 | Lutz | 33/503 |
| 2009/0025241 | A1 | * | 1/2009 | Liu et al. | 33/557 |
| 2009/0106995 | A1 | * | 4/2009 | Zhang et al. | 33/533 |

FOREIGN PATENT DOCUMENTS

| | | |
|---|---|---|
| CN | 87214744 U | 8/1988 |
| CN | 2105043 U | 5/1992 |

* cited by examiner

*Primary Examiner*—G. Bradley Bennett
(74) *Attorney, Agent, or Firm*—Frank R. Niranjan

(57) ABSTRACT

A measuring device, includes a guiding rail, a sliding unit levitatedly slidably engaged with the guiding rail, and a measuring unit fixed to the sliding unit and comprising at least one dial gauge mounted thereto.

14 Claims, 2 Drawing Sheets

MEASURING DEVICE

BACKGROUND

1. Field of the Invention

The present invention relates to measuring devices, especially to a measuring device for detecting parallelism.

2. Description of Related Art

For mechanical equipment such as used for machining, parallelism of some of its parts may need to be frequently adjusted in order to ensure quality performance. For example, a high-precision machine includes a main body having a high-precision threaded shaft, a high-precision slideway, and a fiducial line. It is required that parallelism between the threaded shaft and the fiducial line, and parallelism between the slideway and the fiducial line must be within 0.005 mm, thus frequent checks and adjustments must be made.

Typically, the threaded shaft and slideway of the main body are measured in three-dimensions by a measuring device, then adjusted with other tools according to the result. However, the main body must first be disassembled from the machine then placed in the measuring device, which is inconvenient, especially when the machine is a heavy one. Furthermore, the cost of the measuring device is high.

What is desired, therefore, is a more efficient cost-effective measuring device.

SUMMARY

An exemplary measuring device includes a guiding rail, a sliding unit levitatedly slidably engaged with the guiding rail, and a measuring unit fixed to the sliding unit and comprising at least one dial gauge mounted thereto.

Other advantages and novel features will become more apparent from the following detailed description of embodiment when taken in conjunction with the accompanying drawings, in which:

DETAILED DESCRIPTION

Figure 1:
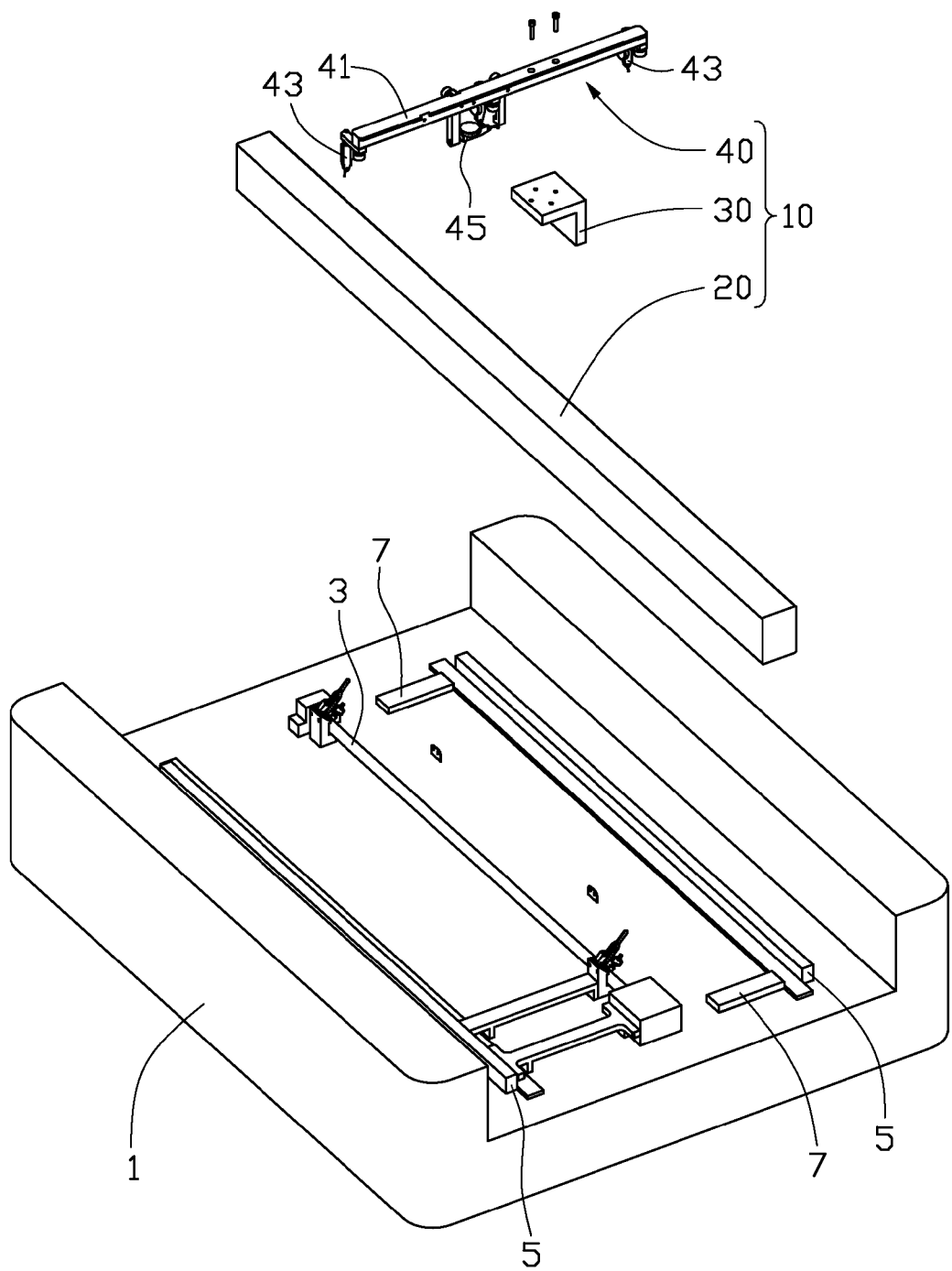
FIG. 1 is an exploded, isometric view of a measuring device in accordance with an embodiment of the present invention together with an object to be measured.
Figure 2:
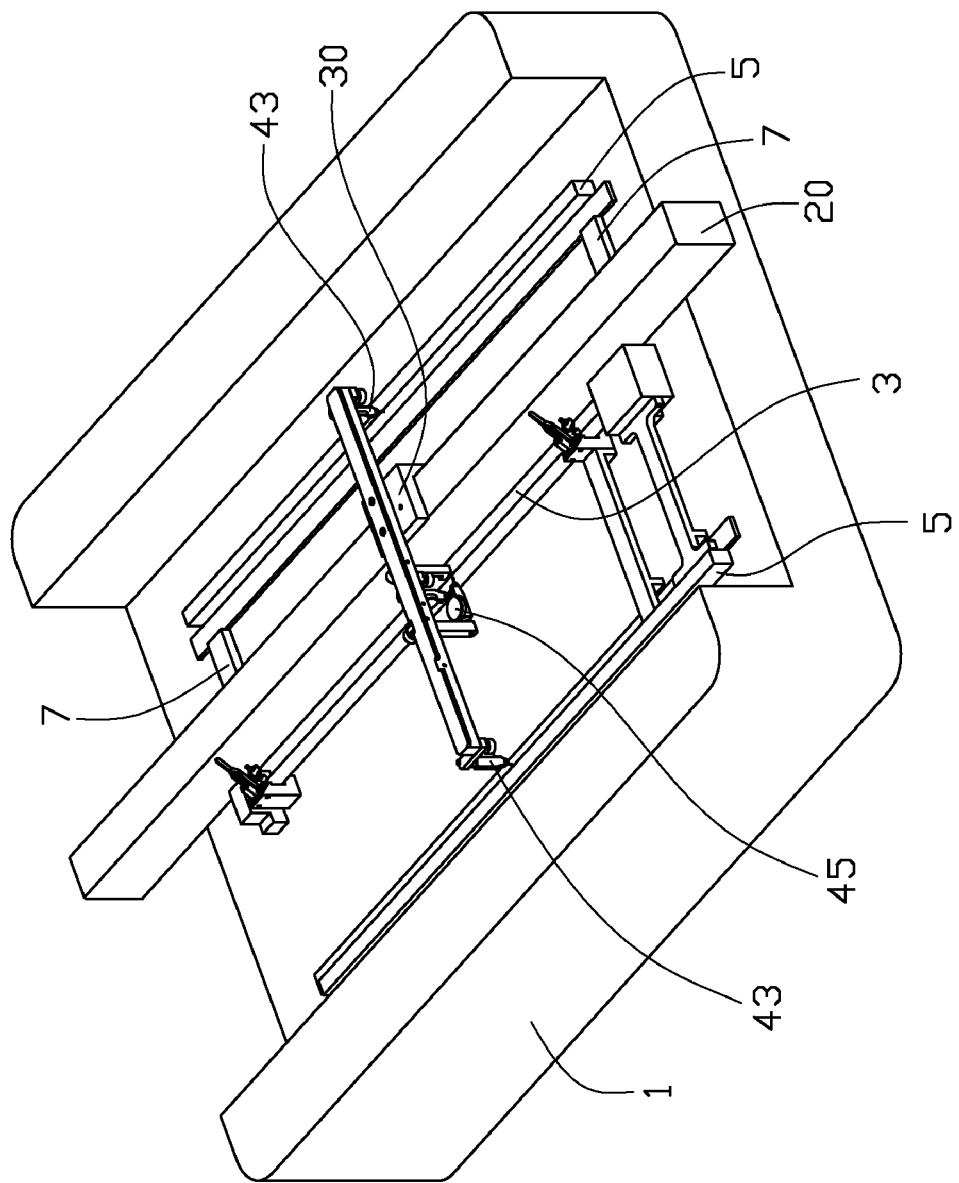
FIG. 2 is an assembled, isometric view of FIG. 1.

Referring to FIGS. 1 and 2, a to-be-measured device 1 includes an adjustable threaded shaft 3 and two adjustable slideways 5. Tolerances of parallelism of the threaded shaft 3 and the adjustable slideways 5 are 0.005 mm. A measuring device 10 in accordance with an embodiment of the present invention includes a guiding rail 20, a sliding unit 30 slidably mounted to the guiding rail 20, and a measuring unit 40 fixed to the sliding unit 30.

Because high measuring accuracy is required, high linearity of the guiding rail 20 is required, and linearity of a working face of the guiding rail 20 is limited to be within 0.003 mm. The guiding rail 20 is made of materials with high hardness and chemically inert property, wherein the high hardness prevents the guiding rail 20 from distorting in use, and the chemically inert property prevents surface accuracy of the guiding rail 20 from being reduced because of damage caused by chemical reactions, such as oxidation. The material of the guiding rail 20 can be marble, granite and so on.

The sliding unit 30 is slidingly engaged on the guiding rail 20 with little or no friction therebetween to ensure measuring accuracy. Economically, in the present embodiment, the sliding unit 30 is an air bearing, but in other embodiments the frictionless engagement may be accomplished via known magnetic levitation, or electrostatic levitation with metal embedded in the guiding rail 20 for generating static charges or electromagnetic field.

The measuring unit 40 includes a fixing bracket 41 secured to the sliding unit 30 via a plurality of fasteners, and a plurality of probes mounted the fixing bracket 41. The probes are, or are connected to gauges with indicating means such as dial gauges, thus enabling an operator to detect and determine amount of deflection of the probes. In the embodiment, two dial gauges 43 are respectively mounted to ends of the fixing bracket 41, and a dial gauge group 45 including a plurality of dial gauges is mounted to a middle portion of the fixing bracket 41.

In use, two fiducial blocks 7 are set on the to-be-measured device 1 beforehand. A sidewall of the guiding rail 20 of the measuring device 10 is propped up to the two fiducial blocks 7, and then the guiding rail 20 is secured to the to-be-measured device 1. Thus, when the sliding unit 30 slides along the guiding rail 20, it is considered that the sliding unit 30 slides along a fiducial line. Tolerances of parallelism of the threaded shaft 3 and the slideways 5 of the to-be-measured device 1 relative to the fiducial line must be limited within 0.005 mm respectively. The dial gauges 43 are respectively used to measure the slideways 5. The dial gauge group 45 measures the threaded shaft 3 from different directions. When the sliding unit 30 is slid along the guiding rail 20, probes of all the dial gauges respectively move along the slideways 5 and the threaded shaft 3 of the to-be-measured device 1 respectively, such that detecting information is gotten from the dial gauges. Then the slideways 5 and the threaded shaft 3 can be adjusted according to the detecting information to meet the requirement of parallelism.

Furthermore, it can be understood that the present measuring device 10 can also be used to detect accuracy of linearity, surface roughness, and so on.

It is believed that the present embodiments and their advantages will be understood from the foregoing description, and they will be apparent that various changes may be made thereto without departing from the spirit and scope of the invention or sacrificing all of its material advantages, the examples hereinbefore described merely being preferred or exemplary embodiments of the invention.

What is claimed is:

1. An assembly comprising:
   a to-be-measured device comprising at least one of an adjustable threaded shaft and an adjustable slideway;
   two fiducial blocks set on the to-be-measured device;
   a guiding rail to be abutted against the fiducial blocks and mounted to the to-be-measured device to be substantially parallel with the at least one of an adjustable threaded shaft and an adjustable slideway;
   a sliding unit levitatedly slidably engaged with the guiding rail, and linearly slidable along a working face of the guiding rail; and
   a measuring unit fixed to the sliding unit and comprising at least one probe mounted thereto to measure the at least one of an adjustable threaded shaft and an adjustable slideway for detecting the parallelism between the at least one of an adjustable threaded shaft and an adjustable slideway and the guiding rail;
   wherein the fiducial blocks cooperatively form a fiducial line for the guiding rail to be arranged therealong.

2. The assembly as claimed in claim 1, wherein linearity of the working face of the guiding rail is limited to be within 0.003 mm.

3. The assembly as claimed in claim 1, wherein the guiding rail is made of materials with chemically inert property.

4. The assembly as claimed in claim 1, wherein the guiding rail is made of oxidation-resistance materials.

5. The assembly as claimed in claim 1, wherein the guiding rail is made of marble or granite.

6. The assembly as claimed as claimed in claim 5, wherein the sliding unit is an air bearing.

7. The assembly as claimed in claim 1, wherein the measuring unit comprises a fixing bracket secured to the sliding unit, the at least one probe is mounted to the fixing bracket.

8. The assembly as claimed in claim 1, wherein the probe is a dial gauge.

9. The assembly as claimed in claim 1, wherein the sliding unit is an air bearing.

10. An assembly comprising:
  a to-be-measured device comprising an adjustable elongate object;
  two fiducial blocks set on the to-be-measured device;
  a guiding rail to be abutted against the fiducial blocks and mounted to the to-be-measured device to be substantially parallel with the object, wherein the fiducial blocks cooperatively forms a fiducial line for the guiding rail to arrange therealong, and linearity of a working face of the guiding rail is limited to be within 0.003 mm;
  a sliding unit levitatedly slidably engaged with the guiding rail, and linearly slidable along the working face of the guiding rail; and
  a measuring unit fixed to the sliding unit and comprising at least one probe mounted thereto to measure the object for detecting the parallelism between the object and the working face of the guiding rail.

11. The assembly as claimed in claim 10, wherein the guiding rail is made of materials with chemically inert property.

12. The assembly as claimed in claim 11, wherein the guiding rail is made of marble or granite.

13. The assembly as claimed as claimed in claim 11, wherein the sliding unit is an air bearing.

14. The assembly as claimed in claim 10, wherein the probe is a dial gauge.

* * * * *